3,079,343
ANTIFREEZE COMPOSITION CONTAINING
AN INDICATOR MATERIAL
George G. Bernard, Crystal Lake, Ill., assignor to The
Pure Oil Company, Chicago, Ill., a corporation of Ohio
No Drawing. Filed Sept. 7, 1960, Ser. No. 54,373
12 Claims. (Cl. 252—75)

This invention relates to new and useful improvements in antifreeze compositions suitable for use as coolants in the cooling systems of internal combustion engines. More particularly, this invention is concerned with an anticorrosive antifreeze composition containing an indicator material for indicating the existence of a corrosive condition.

For many years, it has been customary to add water-miscible alcohols (e.g., alcohols, glycols, polyglycols, glycerols, etc.) to the water of automotive cooling systems to prevent freezing during cold weather. Water-miscible, monohydric alcohols, e.g., methanol, ethanol, isopropanol, and n-propanol, have been used as "non-permanent" antifreezes. These alcohols have often been used because they are relatively inexpensive and provide adequate protection against freezing. However, the boiling point of the lower alcohols is such that they tend to boil out of the cooling system and must be replaced from time to time. For a number of years, glycols, e.g., ethylene glycol, propylene glycol, diethylene glycol, and dipropylene glycol mixtures have been used as "permanent" antifreezes, which provide protection against freezing and have boiling points which are sufficiently high to avoid loss by boiling away. The glycols, however, are readily oxidized to organic acids (e.g., oxalic acid) which may be corrosive in the cooling system. It has been customary to incorporate corrosion inhibitors in antifreeze compositions both of the monohydric-alcohol and glycol types. At the end of a single season of use, the antifreeze compositions are generally discarded. Recently, manufacturers of alcohols, glycols, and the like, have developed antifreeze compositions which are provided with corrosion inhibitors which resist corrosion for longer periods of time and which compositions are useful for periods of many months without necessity of change. In using antifreeze compositions, particularly the "permanent" antifreezes, over extended periods of time (e.g., two years), the corrosion inhibitors become depleted and the solution may become quite corrosive. There is, therefore, a need for an antifreeze composition which is provided with a means to indicate the existence of a corrosive condition.

It is therefore one object of this invention to provide an improved antifreeze composition which indicates the existence of a corrosive condition.

Another object of this invention is to provide an improved antifreeze composition which indicates by color change the presence of an excessive amount of dissolved iron.

A feature of this invention is the provision of an improved antifreeze composition containing an indicator compound which changes color in response to the presence of dissolved iron and a complexing agent which forms a colorless stable complex with dissolved iron until the dissolved iron content of the antifreeze has exceeded a predetermined level.

A further feature of this invention is the provision of an improved antifreeze composition which comprises a monohydric or polyhydric alcohol containing in solution a small amount of a compound which forms an intense color on reaction with dissolved iron and a chelating or sequestering compound which forms a stable colorless complex with iron ions and prevents color change of the composition until the iron content has reached a level which is indicative of the existence of a corrosive condition.

Other objects and features of this invention will become apparent from time to time throughout the specification and claims as hereinafter related.

When a fresh antifreeze solution is placed in the cooling system of an automobile, it contains only trace amounts of dissolved iron. However, after the solution has been in use in an automobile cooling system for a long time, and especially after a corrosion inhibitor has become depleted, iron in the cooling system corrodes and the iron content of the solution increases rapidly. It has been found that an increase in the iron content of an antifreeze solution to more that 555 p.p.m. in less than two years indicates that the solution has become very corrosive and should be discarded. In accordance with this invention, I obtained a meaningful colorimetric indication of the occurrence of corrosion by adding two agents to the fresh antifreeze solution which may react with the dissolved iron. The first agent is a compound which reacts with dissolved iron to form an iron compound which is soluble in the antifreeze solution and which has a color distinctly different from the color of the solution. The preferred indicator compound for this purpose is 2,2'-bipyridine, which forms an intense red color in the presence of dissolved iron. Of course, other indicators could be used, provided only that a sufficiently intense color is generated by reaction with iron in solution and the resulting iron compound (or complex) is less stable than that formed with the other complex-forming reagent in the solution. The second agent is one which forms a colorless complex preferentially with iron and is added in an amount which will complex the amount of iron during the proposed period of use of the solution. Complexing agents which may be used include any of the well-known chelating or sequestering agents which form complexes with ferric or ferrous ions which are more stable than the colored complex formed with bipyridine. Suitable chelating or sequestering agents include salts of aminopolycarboxylic acids, such as ethylenediaminetetraacetic acid, etc.

When an antifreeze composition is prepared, using any water-miscible monohydric or polyhydric alcohol as the base, and provided with a corrosion inhibitor and an iron-complexing agent and iron-indicating agent as previously described, the antifreeze solution can be used for extended periods of time and turns to a deep red color (or other color, depending upon the indicator used) when it has become sufficiently corrosive to have acquired more than a predetermined amount of iron. In preparing antifreeze compositions in accordance with this invention, any suitable alcoholic antifreeze compound may be used. Antifreeze compounds which are satisfactory for use in this invention include all of the water-miscible monohydric and polyhydric alcohols. Among the simple monohydric alcohols, only methanol, ethanol, n-propanol, and isopropanol are completely water-miscible. Simple glycols, such as ethylene glycol, propylene glycol, butylene glycol, amylene glycol, and hexylene glycol, may likewise be used. Water-miscible glycol ethers (sold under the trademark of Cellosolves) may also be used as antifreeze compositions. Polyglycols, such as diethylene glycol, triethylene glycol, tetraethylene glycol, etc., dipropylene glycol, tripropylene glycol, tetrapropylene glycol, etc., and polyols, such as glycerol, trimethylolpropane, and 1,2,6-hexanetriol may be used as antifreeze bases in accordance with this invention. It is obvious, of course, that the selection of materials for use as antifreeze compositions is determined largely by economic considerations and so in commercial practice is limited to "antifreeze grades" of methanol, ethanol, and ethylene glycol. "Antifreeze grade" of ethylene glycol may contain up to 20% propylene glycol, diethylene glycol, and/or dipropylene glycol.

The following non-limiting examples are illustrative of the scope of this invention.

Example I

An antifreeze base was prepared consisting of antifreeze-grade ethylene glycol containing 2.5% sodium metaborate tetrahydrate ($NaBO_2 \cdot 4H_2O$) and 0.5% sodium mercaptobenzothiazole

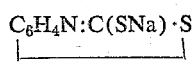

as corrosion inhibitors. To this solution, there was added 5 p.p.m. 2,2'-bipyridine (although the amount used may vary widely, e.g., from 0.05–500 p.p.m.), which will form an intense red color upon reaction with dissolved iron. To this solution, there was added 4160 p.p.m. of the tetrasodium salt of ethylenediaminetetraacetic acid, which is sufficient to preferentially complex 555 p.p.m. of dissolved iron. The amount of complexing agent (EDTA) used may vary widely, e.g., 3–30,000 p.p.m., depending upon the concentration of color indicator used and the concentration of iron at which a color change is desired. When this antifreeze composition is used in an automotive cooling system, it remains colorless until the iron concentration reaches 555 p.p.m., whereupon the solution turns red. This change in color is an indication to the motorist that the solution has become so corrosive that it should be discarded, or provided with additional amounts of corrosion inhibitor. This antifreeze composition may be used in concentrated form as prepared above, or may be diluted with water to any desired concentration.

Example II

An antifreeze composition is prepared consisting of antifreeze-grade methanol containing 3.5% of sodium tetraborate decahydrate ($Na_2B_4O_7 \cdot 10H_2O$) as corrosion inhibitor. To this solution, there is added 5 p.p.m. of 2,2'-bipyridine and 4,160 p.p.m. of the tetrasodium salt of ethylenediaminetetraacetic acid (EDTA). This solution remains colorless until a dissolved iron content of 555 p.p.m. is reached, whereupon the solution turns red.

Example III

An antifreeze composition is prepared consisting of propylene glycol containing 3.5% of sodium tetraborate decahydrate ($Na_2B_4O_7 \cdot 10H_2O$) as corrosion inhibitor. To this solution, there is added 5 p.p.m. 2,2'-bipyridine and 4,160 p.p.m. sodium salt of EDTA, sufficient to complex with 555 p.p.m. dissolved iron. This antifreeze composition remains colorless in use until the dissolved iron content reaches a level of 555 p.p.m., whereupon the solution turns red.

Example IV

An antifreeze composition is prepared consisting of diethylene glycol containing 3.0% of sodium tetraborate decahydrate corrosion inhibitor. To this solution, there is added 10 p.p.m. of 2,2'-bipyridine and 4,160 p.p.m. tetrasodium salt of EDTA. This solution remains colorless until a dissolved iron content of 555 p.p.m. is reached, whereupon the solution turns red.

Example V

An antifreeze composition is prepared consisting of glycerol containing 2.5% of triethanolamine phosphate as corrosion inhibitor. To this solution, there is added 7 p.p.m. of 2,2'-bipyridine and 4,160 p.p.m. of tetrasodium salt of ethylenediaminetetraacetic acid. This solution remains colorless until a dissolved iron content of 555 p.p.m. is reached, whereupon the solution turns red.

In preparing antifreeze compositions in accordance with this invention, the particular corrosion inhibitors used are selected on the basis of economical considerations and solubility in the antifreeze. Thus, any corrosion inhibitors known to the prior art for use in antifreeze compositions may be used in the compositions of this invention. The color-indicator compounds used in the antifreeze solution include any compounds which will react with iron to produce compounds or complexes having sufficient color to provide an indication of the presence of iron. The compounds which are used for indicating the presence of iron are added to the solution in an amount just sufficient to provide the desired color change. The use of greater amounts of these compounds is not detrimental, but would be uneconomical. The chelating agents or sequestering agents used in the compositions of this invention include any and all known chelating agents which will form stable, colorless complexes with ferric or ferrous ions, as heretofore described. The concentration of the sequestering or chelating agents used must be sufficient to form a stable complex with an amount of iron which represents the amount of iron present in the antifreeze composition during normal use when the antifreeze composition is considered to be non-corrosive. The presence of the chelating or sequestering agent prevents the formation of the colored iron-indicating compound until the iron content of the solution is in excess of an amount which is indicative of a corrosive solution. While this invention is primarily concerned with compositions based on ethylene glycol (or aqueous solutions thereof) as automotive antifreezes, the invention is applicable in principle to any antifreeze materials, or aqueous solutions thereof.

While I have described this invention fully and completely with special emphasis upon several preferred embodiments thereof, I wish it to be understood that this invention may be practiced otherwise than as specifically described herein.

The embodiments of the invention in which an exclusive property or privilege is claimed are defined as follows:

1. An antifreeze composition consisting essentially of a liquid alcoholic compound selected from the group consisting of water-miscible monohydric and polyhydric alcohols containing in solution from about 0.05–500 p.p.m. of 2,2'-bipyridine and from about 3–30,000 p.p.m. of the tetrasodium salt of ethylenediaminetetraacetic acid.

2. An antifreeze composition according to claim 1 which contains in solution a corrosion inhibitor.

3. An antifreeze composition according to claim 1 which is diluted with water.

4. An antifreeze composition according to claim 1 in which the alcoholic compound is a $C_1$–$C_3$ alcohol.

5. An antifreeze composition according to claim 1 in which the alcoholic compound is a glycol.

6. An antifreeze composition according to claim 5 in which said glycol is ethylene glycol.

7. An antifreeze composition according to claim 5 in which said glycol is diethylene glycol.

8. An antifreeze composition according to claim 1 in which the alcoholic compound is a polyglycol.

9. An antifreeze composition according to claim 1 in which the alcoholic compound is a glycerol.

10. An antifreeze composition consisting essentially of antifreeze-grade ethylene glycol containing about 5 p.p.m. of 2,2'-bipyridine, 4,160 p.p.m. of the tetrasodium salt of ethylenediaminetetraacetic acid, and a corrosion inhibitor.

11. An aqueous solution of the antifreeze composition defined in claim 10.

12. An antifreeze composition consisting essentially of antifreeze-grade methanol containing about 5 p.p.m of 2,2'-bipyridine, 4,160 p.p.m. of the tetrasodium salt of ethylenediaminetetraacetic acid, and a corrosion inhibitor.

References Cited in the file of this patent

UNITED STATES PATENTS

| | | |
|---|---|---|
| 2,249,867 | Snelling | July 22, 1941 |
| 2,583,891 | Schwarzenbach | Jan. 29, 1952 |
| 2,937,145 | Cutlip et al. | May 17, 1960 |
| 2,937,146 | Cutlip et al. | May 17, 1960 |

OTHER REFERENCES

Feigl: Chemistry of Specific, Selective and Sensitive Reactions, Academic Press Inc., New York (1949), page 201.

Merck Index, 6th ed., Merck and Co., Inc., Rahway, N.J. (1952), page 371.